(12) United States Patent
Kielczykowski et al.

(10) Patent No.: US 10,465,666 B2
(45) Date of Patent: Nov. 5, 2019

(54) SPRING COMPRESSION DEVICE

(71) Applicant: Hamilton Sundstrand Corporation, Charlotte, NC (US)

(72) Inventors: Przemyslaw Kielczykowski, Wroclaw (PL); Pawel Banach, Lublin (PL)

(73) Assignee: HAMILTON SUNDSTRAND CORPORATION, Charlotte, ND (US)

( * ) Notice: Subject to any disclaimer, the term of this patent is extended or adjusted under 35 U.S.C. 154(b) by 78 days.

(21) Appl. No.: 15/638,925

(22) Filed: Jun. 30, 2017

(65) Prior Publication Data

US 2018/0003162 A1 Jan. 4, 2018

(30) Foreign Application Priority Data

Jul. 1, 2016 (EP) ..................... 16461533

(51) Int. Cl.

| *F16F 1/12* | (2006.01) |
|---|---|
| *F03G 1/02* | (2006.01) |
| *B64D 41/00* | (2006.01) |
| *F01D 25/28* | (2006.01) |
| *F03G 1/06* | (2006.01) |
| *F16F 3/04* | (2006.01) |

(52) U.S. Cl.
CPC ............. *F03G 1/02* (2013.01); *B64D 41/007* (2013.01); *F01D 25/28* (2013.01); *F03G 1/06* (2013.01); *F05D 2220/34* (2013.01); *F16F 3/04* (2013.01); *F16F 2228/066* (2013.01)

(58) Field of Classification Search
CPC .. F16F 1/121; F16F 2228/066; B64D 41/007; F03G 1/06; F05D 2220/34
See application file for complete search history.

(56) References Cited

U.S. PATENT DOCUMENTS

| 993,510 | A | * | 5/1911 | Cowles | .................. F16L 3/2053 |
|---|---|---|---|---|---|
| | | | | | 248/59 |
| 2,274,504 | A | * | 2/1942 | Shepherd | ........... B65G 49/0404 |
| | | | | | 118/428 |
| 2,281,543 | A | * | 5/1942 | Baumbach | ............. B21D 37/10 |
| | | | | | 279/100 |
| 2,955,656 | A | * | 10/1960 | Balje | ..................... F03D 7/0212 |
| | | | | | 416/137 |
| 3,504,419 | A | | 4/1970 | Bozsanyi | |

(Continued)

FOREIGN PATENT DOCUMENTS

| JP | 2006214453 A | 8/2006 |
|---|---|---|
| JP | 2013011295 A | 1/2013 |

OTHER PUBLICATIONS

European Search Report for application EP 16461533.8, dated Jan. 13, 2017, 7 pgs.

*Primary Examiner* — Bradley T King
(74) *Attorney, Agent, or Firm* — Cantor Colburn LLP (57) ABSTRACT

A spring compression device comprises a spring sleeve configured to receive a spring; a spring adjustment member provided on and engaged with the spring sleeve and configured to abut a spring mounted on the spring sleeve, wherein the spring sleeve and spring adjustment member define an operating length (L) of the spring compression device, and the spring adjustment member is configured to be moved relative to the spring sleeve to adjust the operating length of the spring compression device; and at least one blocking component for blocking movement between the spring sleeve and the spring adjustment member.

12 Claims, 6 Drawing Sheets

(56) References Cited

U.S. PATENT DOCUMENTS

| | | | | |
|---|---|---|---|---|
| 4,676,458 A * | 6/1987 | Cohen | B64D 41/007 | 244/58 |
| 4,743,163 A * | 5/1988 | Markunas | F01D 7/02 | 416/137 |
| 4,767,249 A * | 8/1988 | Elcock | F16B 37/122 | 29/432 |
| 5,044,614 A * | 9/1991 | Rau | B60G 15/062 | 267/175 |
| 5,954,318 A * | 9/1999 | Kluhsman | B60G 11/16 | 267/175 |
| 6,767,010 B2 * | 7/2004 | Miller | B60G 15/063 | 188/322.19 |
| 7,419,357 B2 * | 9/2008 | Nohr | B64D 41/007 | 416/44 |
| 8,640,563 B2 | 2/2014 | Lang et al. | | |
| 9,399,522 B2 * | 7/2016 | Bannon | F15B 15/261 | |
| 9,878,800 B2 * | 1/2018 | Russ | B64D 41/007 | |
| 10,012,246 B2 * | 7/2018 | Bannon | F15B 15/1457 | |
| 10,081,440 B2 * | 9/2018 | Bannon | F03D 9/25 | |
| 2010/0143031 A1 * | 6/2010 | Chamberlin | F16B 39/025 | 403/409.1 |
| 2014/0001684 A1 | 1/2014 | Miyata | | |

\* cited by examiner

SPRING COMPRESSION DEVICE

FOREIGN PRIORITY

This application claims priority to European Patent Application No. 16461533.8 filed Jul. 1, 2016, the entire contents of which is incorporated herein by reference.

FIELD

The present disclosure relates to a spring compression device, for example a spring compression device for use in spring-biased deployment actuators.

BACKGROUND

Modern aircraft often include an emergency power system to provide power in the event that power is unavailable from the primary or auxiliary power system. Ram air turbines (RATs) are commonly used as an emergency power system to provide electrical and/or hydraulic power in such an event. An RAT presents a rotatable turbine to an oncoming airstream, causing the turbine to rotate. In turn, the turbine then operates a suitable power conversion device (for example, an electrical generator or a hydraulic pump) to provide power to the aircraft.

The RAT is stowed in the aircraft structure, and is deployed manually or automatically by a deployment actuator following the loss of power from the primary or auxiliary power system. The deployment actuator commonly comprises an actuator assembly with a spring-biased mechanism A primary spring member can provide the required force to move the RAT from a stowed position to a deployed position.

As the RAT is deployed during flight, it can experience strong cross winds and turbulence. In order to control the deployment of the RAT, the actuator assembly can further comprise a number of auxiliary springs, which are provided to compensate for the movement of the RAT as it is deployed into the oncoming airstream.

An important design consideration is the time it takes for the RAT to be deployed. The timing must be tightly controlled in order to prevent associated components being damaged during deployment and powering up. One way to improve control over deployment time involves tuning the auxiliary springs to a desired preload or compression level. It is known that shims may be provided to adjust the auxiliary spring preload, for example to take account of machining tolerances or tolerances in the spring itself.

The inventors have identified that current deployment actuators for an RAT could be improved.

SUMMARY

According to an embodiment of the disclosure, there is provided a spring compression device, comprising: a spring sleeve configured to receive a spring; a spring adjustment member provided on and engaged with the spring sleeve and configured to abut a spring mounted on the spring sleeve, wherein: the spring sleeve and spring adjustment member define an operating length of the spring compression device, and the spring adjustment member is configured to be moved relative to the spring sleeve to adjust the operating length of the spring compression device; and at least one blocking component for blocking movement between the spring sleeve and the spring adjustment member (e.g., once the operating length has been set).

In a further embodiment of any of the above, the spring sleeve and spring adjustment member may be engaged with a threaded connection.

In a further embodiment of any of the above, an exterior surface of the spring sleeve and an interior surface of the spring adjustment member may each have at least one recess which align to form a hole for receiving the blocking component.

In a further embodiment of any of the above, the hole may extend in a direction parallel to a longitudinal axis of the spring sleeve.

In a further embodiment of any of the above, the blocking component may be press-fitted into the hole.

In a further embodiment of any of the above, the blocking component may comprise a pin.

In a further embodiment of any of the above, the spring adjustment member may further comprise a grip feature configured to engage with a tool for adjusting the position of the spring adjustment member along a longitudinal axis of the spring sleeve.

In a further embodiment of any of the above, the spring adjustment member may have a radially extending flange to provide a stop for a spring mounted on the spring sleeve.

According to another embodiment of the disclosure, there is provided a spring compression assembly, comprising: a spring sleeve configured to receive a spring; a spring adjustment member provided on and engaged with the spring sleeve and configured to abut a spring mounted on the spring sleeve, wherein: the spring sleeve and spring adjustment member define an operating length of the spring compression device, and the spring adjustment member is configured to be move relative to the spring sleeve to adjust the operating length of the spring compression device; and at least one blocking component for blocking movement between the spring sleeve and the spring adjustment member; and a first spring mounted on the spring sleeve and abutting the spring adjustment member.

In a further embodiment of any of the above, a second spring may be housed inside the spring sleeve.

According to another embodiment of the disclosure, there is provided a deployment actuator for a ram air turbine, comprising: a spring sleeve configured to receive a spring; a spring adjustment member provided on and engaged with the spring sleeve and configured to abut a spring mounted on the spring sleeve, wherein: the spring sleeve and spring adjustment member define an operating length of the spring compression device, and the spring adjustment member is configured to be move relative to the spring sleeve to adjust the operating length of the spring compression device; and at least one blocking component for blocking movement between the spring sleeve and the spring adjustment member; and a first spring mounted on the spring sleeve and abutting the spring adjustment member.

In a further embodiment of any of the above, the spring sleeve and spring adjustment member may be engaged with a threaded connection.

In a further embodiment of any of the above, an exterior surface of the spring sleeve and an interior surface of the spring adjustment member may each have at least one recess which align to form a hole for receiving the blocking component.

In a further embodiment of any of the above, the hole may extend in a direction parallel to a longitudinal axis of the spring sleeve.

In a further embodiment of any of the above, the blocking component may be press-fitted into the hole.

In a further embodiment of any of the above, the blocking component may comprise a pin.

In a further embodiment of any of the above, the spring adjustment member may further comprise a grip feature configured to engage with a tool for adjusting the position of the spring adjustment member along a longitudinal axis of the spring sleeve.

In a further embodiment of any of the above, the spring adjustment member may have a radially extending flange to provide a stop for a spring mounted on the spring sleeve.

In a further embodiment of any of the above, first spring may be mounted on the spring sleeve and abutting the spring adjustment member.

In a further embodiment of any of the above, a second spring may be housed inside the spring sleeve.

According to another embodiment of the disclosure, there is provided a method for adjusting the compression of a spring, comprising: providing a spring adjustment member on a spring sleeve, wherein the spring sleeve and spring adjustment member define an operating length of a spring compression device; adjusting the operating length of the spring compression device with the spring adjustment member by moving the spring adjustment member with respect to the spring sleeve; and blocking movement between the spring sleeve and the spring adjustment member with a blocking component.

In a further embodiment of any of the above, the spring sleeve and spring adjustment member may be engaged with a threaded connection; and the step of adjusting the operating length of the spring compression device with the spring adjustment member may comprise screwing the spring adjustment member along the spring sleeve.

In a further embodiment of any of the above, the spring adjustment member may further comprise a grip feature configured to engage with a tool, and the step of adjusting the operating length of the spring compression device with the spring adjustment member may comprise engaging the grip feature with a tool to adjust the position of the spring adjustment member along a longitudinal axis of the spring sleeve.

In a further embodiment of any of the above, an exterior surface of the spring sleeve and an interior surface of the spring adjustment member may each have at least one recess which align to form a hole for receiving the blocking component; and the step of blocking movement between the spring sleeve and the spring adjustment member with the blocking component may comprise disposing the blocking component in the hole.

In a further embodiment of any of the above, the blocking component may be introduced into the hole in a direction parallel to a longitudinal axis of the spring sleeve.

According to another embodiment of the disclosure, there is provided a method for adjusting the compression of a spring in a deployment actuator for a ram air turbine, comprising: providing a spring adjustment member on a spring sleeve, wherein the spring sleeve and spring adjustment member define an operating length of the spring compression device; adjusting the operating length of the spring compression device with the spring adjustment member by moving the spring adjustment member with respect to the spring sleeve; and blocking movement between the spring sleeve and the spring adjustment member with a blocking component.

In a further embodiment of any of the above, the spring sleeve and spring adjustment member may be engaged with a threaded connection; and the step of adjusting the operating length of the spring compression device with the spring adjustment member may comprise screwing the spring adjustment member along the spring sleeve.

In a further embodiment of any of the above, the spring adjustment member may further comprise a grip feature configured to engage with a tool, and the step of adjusting the operating length of the spring compression device with the spring adjustment member may comprise engaging the grip feature with a tool to adjust the position of the spring adjustment member along a longitudinal axis of the spring sleeve.

In a further embodiment of any of the above, an exterior surface of the spring sleeve and an interior surface of the spring adjustment member may each have at least one recess which align to form a hole for receiving the blocking component; and the step of blocking movement between the spring sleeve and the spring adjustment member with the blocking component may comprise disposing the blocking component in the hole.

In a further embodiment of any of the above, the blocking component may be introduced into the hole in a direction parallel to a longitudinal axis of the spring sleeve.

These and other features of the systems and methods of the subject disclosure will become more readily apparent to those skilled in the art from the following detailed description taken in conjunction with the drawings, which illustrate embodiments of the present disclosure by way of example only.

BRIEF DESCRIPTION OF THE FIGURES

So that those skilled in the art to which the subject disclosure appertains will readily understand how to make and use the devices and methods of the subject disclosure without undue experimentation, embodiments thereof will be described in detail herein below by way of example only and with reference to certain figures, wherein.

DETAILED DESCRIPTION

Figure 1A:
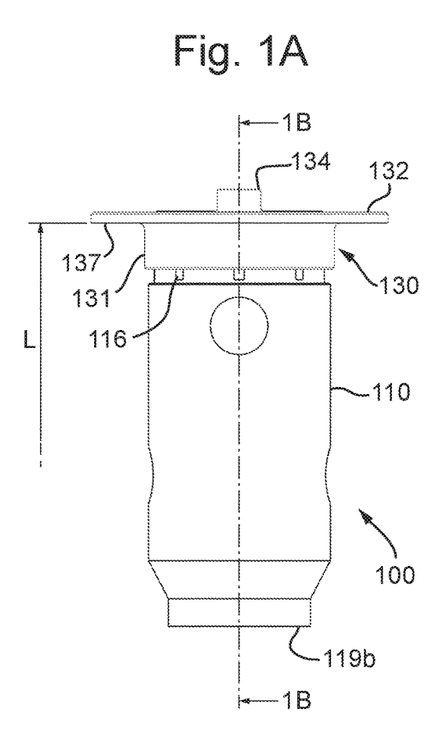
FIG. 1A shows a schematic of an exemplary spring compression device for use in a spring compression assembly.

Reference will now be made to the drawings wherein like reference numerals identify similar structural features or aspects of the subject disclosure. For purposes of explanation and illustration, and not limitation, an illustrative view of an embodiment of a spring compression device is shown in FIGS. 1A and 1s designated generally by reference character 100. The spring compression device 100 can be used to adjust the preload of a spring, and may additionally be referred to as an adjustable preload mechanism. Other aspects of this disclosure are shown in FIGS. 1B to 5.

Figure 1B:
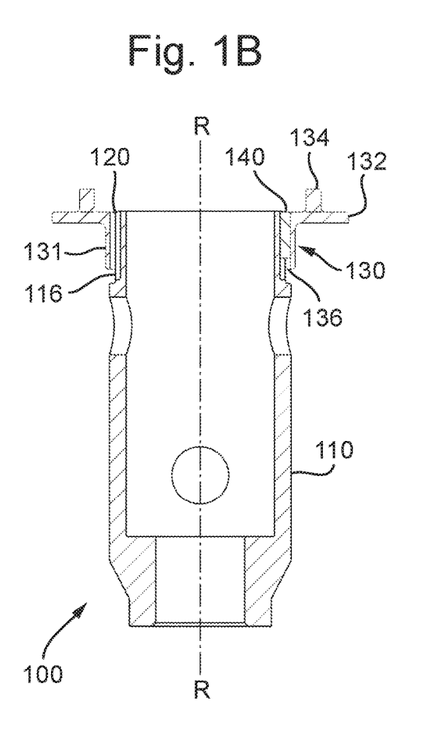
FIG. 1B shows a cross-sectional view of the spring compression device of FIG. 1A.

The spring compression device 100 comprises a spring sleeve 110, a spring adjustment member 130 and a blocking component 140.

Figure 2A:
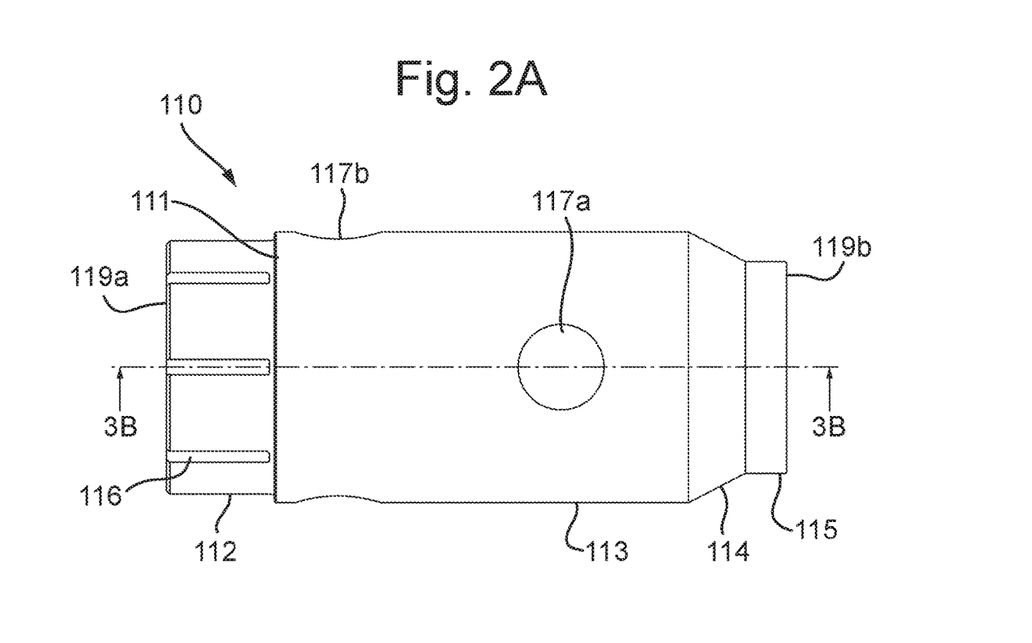
FIG. 2A shows a schematic of an exemplary spring sleeve for use in a spring compression device.
Figure 2B:
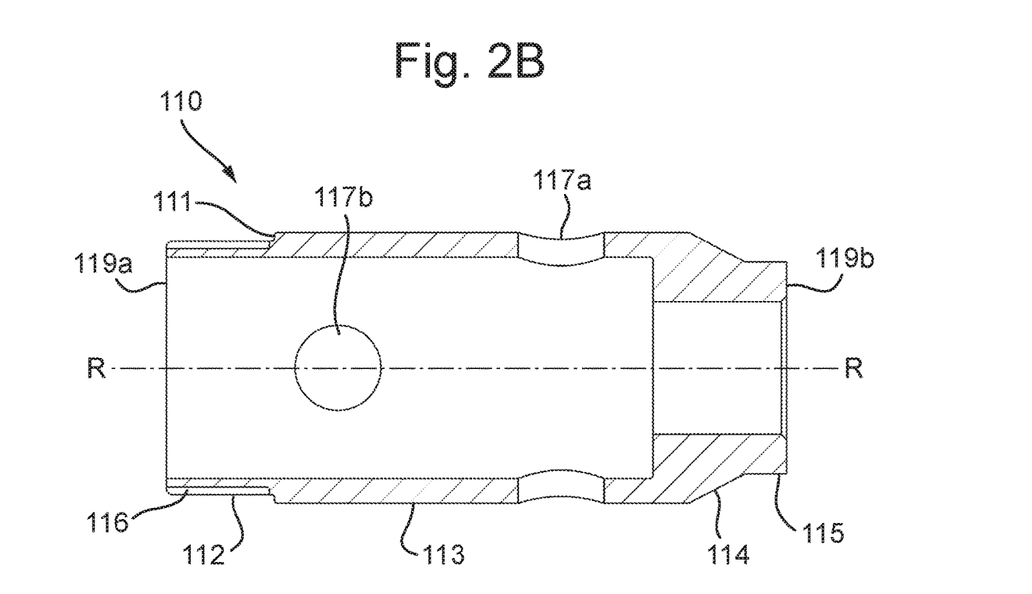
FIG. 2B shows a cross-sectional view of the spring sleeve of FIG. 2A.

Referring additionally to FIGS. 2A and 2B, the spring sleeve 110 has a longitudinal axis R-R. The spring sleeve 110 may comprise a mating portion 112, a body portion 113, and an end portion 115. A hilt 111 may define the boundary between the mating portion 112 and the body portion 113. A tapered portion 114 may separate the body portion 113 and the end portion 115.

The mating portion 112 may include at least one recess 116 on its exterior surface, extending longitudinally from a first end 119a of the mating portion 112 towards the hilt 111. The body portion 113 of the spring sleeve 110 may include a number of holes 117a, 117b extending radially therethrough, to allow for the passage of hydraulic fluid associated with the actuator. The spring sleeve 110 may be hollow, and an auxiliary spring may be provided therein.

Figure 3A:
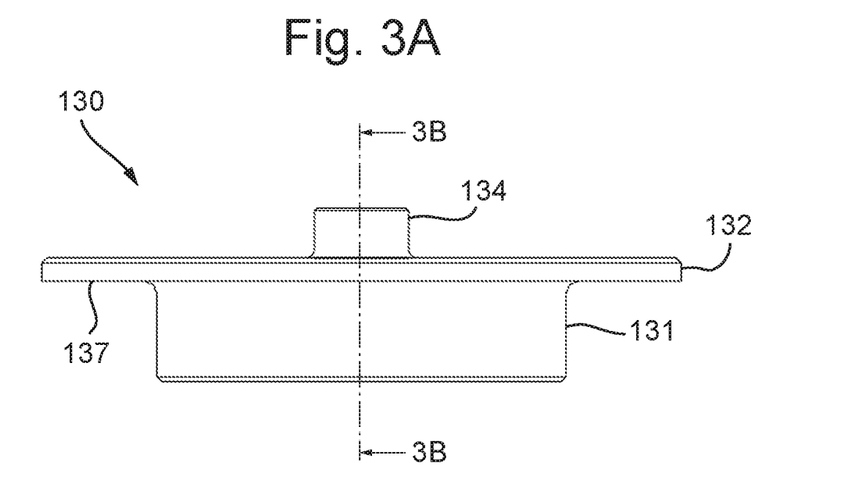
FIG. 3A shows a schematic of an exemplary spring adjustment member for use in a spring compression device.
Figure 3B:
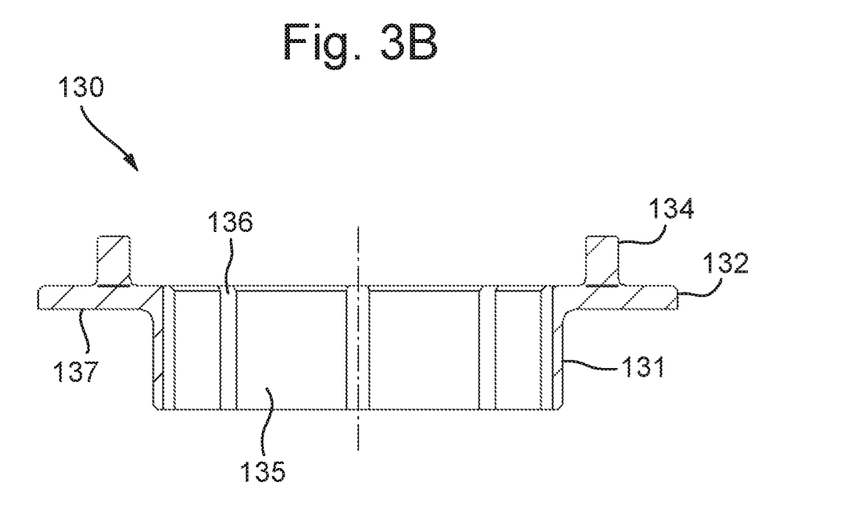
FIG. 3B shows a cross-sectional view of the spring adjustment member of FIG. 3A.

Referring additionally to FIGS. 3A and 3B, the spring adjustment member 130 may comprise a collar 131 and a radially extending flange 132 extending therefrom. The interior surface 135 of the spring adjustment member 130 may include a number of recesses 136 extending along its length. An exterior end surface of the flange 132 may have one or more grip features 134 which are configured to engage with a tool (not shown).

As shown in FIGS. 1A and 1B, the collar 131 of the spring adjustment member 130 may be provided on and engaged with the mating portion 112 of the spring sleeve 110. The spring sleeve 110 and the spring adjustment member 130 define an operating length L of the spring compression device 100 for setting a preload of a spring. The operating length L may extend between the underside 137 of the flange 132 of the spring adjustment member 130 and the outer end 119b of the end portion 115, but it is also anticipated the operating length L may extend beyond the end portion 115, or indeed stop short of the end portion 115.

The mating portion 112 of the spring sleeve 110 may engage with the collar 131 of the spring adjustment member 130 with a threaded connection 120. The operating length L of the spring compression device 100 may thus be adjusted through screwing the spring adjustment member 130 about the mating portion 112 of the spring sleeve 110.

It is anticipated that the operating length L may be increased or decreased through changing the direction of rotation of the spring adjustment member 130 relative to the spring sleeve 110.

The grip feature(s) 134 may engage with a tool (not shown) to aid with the positioning of the spring adjustment member 130 relative to the spring sleeve 110, and thus aid with setting the operating length L of the spring compression device 100.

Figure 4A:
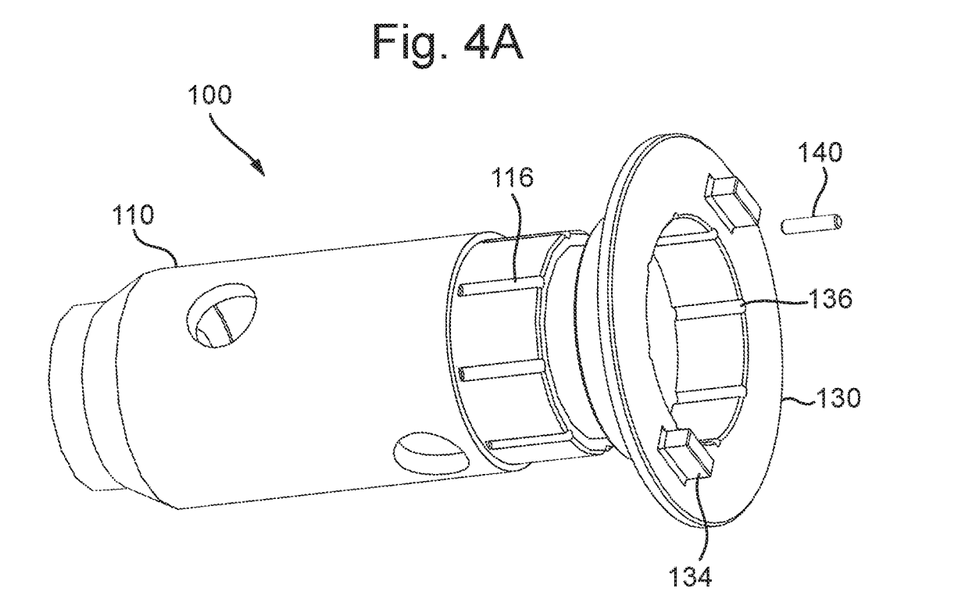
FIG. 4A shows an exploded view of the spring compression device of FIG. 3A.
Figure 4B:
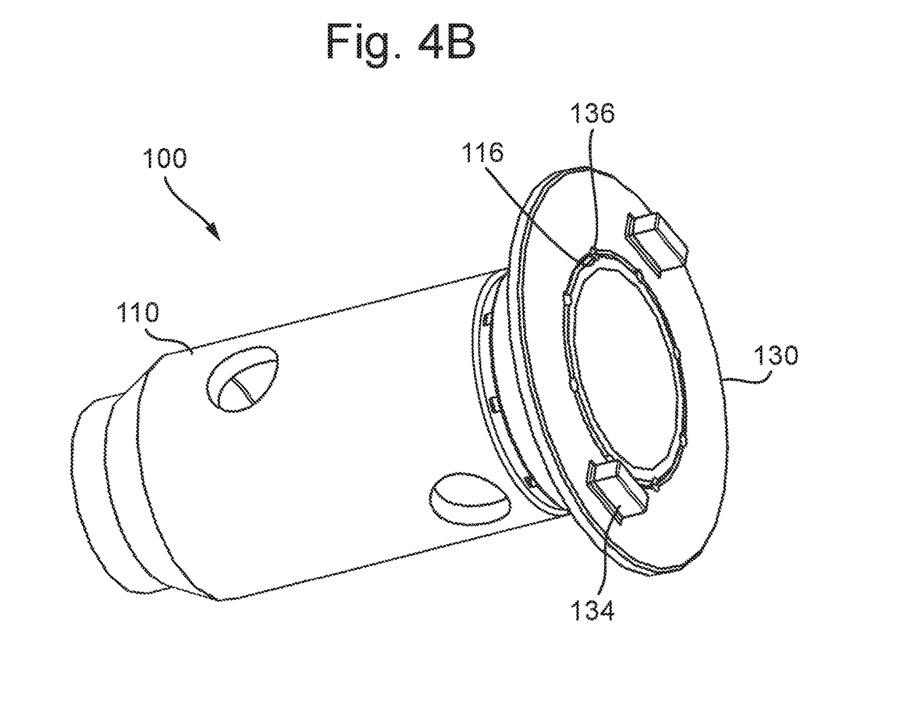
FIG. 4B shows an alternative view of the spring compression device of FIG. 3A.

Referring additionally to FIGS. 4A and 4B, through rotation of the spring adjustment member 130 about the spring sleeve 110, one of the recesses 136 provided on the interior surface 135 of the spring adjustment member 130 may be aligned with the recess or one of the recesses 116 on the exterior surface of the mating portion 112 of the spring sleeve 110. When aligned, the mating recesses 116, 136 define a hole extending in a direction parallel to the longitudinal axis R-R of the spring sleeve 110, between the spring sleeve 110 and the spring adjustment member 130. A blocking component 140 may be disposed in the hole formed by the mating recesses 116, 136. As the hole may extend in a direction parallel to the longitudinal axis R-R, the blocking component 140 may be inserted in this longitudinal direction, which is helpful for access during installation and maintenance. The blocking component 140 naturally presents a relatively large amount of surface area in this orientation to react to the shear forces.

Rotation of the spring adjustment member 130 about the spring sleeve 110 may thus be blocked, rendering the threaded connection 120 inoperative. The position of the spring adjustment member 130 relative to the spring sleeve 110, and thus the operating length L of the spring compression device 100, may be fixed.

Any suitable number of recesses 116, 136 may be provided. It is anticipated that the number of recesses 116 provided on the spring sleeve 110 may equal the number of recesses 136 provided on the spring adjustment member 130.

Further, the recesses 116, 136 may be equally spaced about the circumference of their respective components, such that during alignment, when one pair of mating recesses 116, 136 align to form a hole, all mating recesses 116, 136 form holes. A blocking component 140 may be provided in any combination of the holes formed from mating recesses 116, 136. Any appropriate number of blocking components 140 may be provided.

The blocking component 140 may be a pin. The recesses 116, 136 may have any suitable cross-section, such that when aligned the hole formed has a cross-section matching that of blocking component 140. For example, the hole and the blocking component 140 may have a circular cross-section. Further, it is anticipated that the blocking component 140 may be press-fitted into the hole formed from the mating recesses 116, 136. A circular cross-section avoids complications from misalignment; however other cross-sections could still be used for the blocking component 140.

The spring sleeve 110 and the spring adjustment member 130 may each be manufactured as single parts. It is anticipated that any appropriate material may be chosen for the components of the spring compression device 100. Appropriate materials may include those that can withstand the range of operating temperatures and conditions experienced during flight. The spring adjustment member 130 and spring sleeve may be made of different materials to avoid cold welding.

Figure 5:
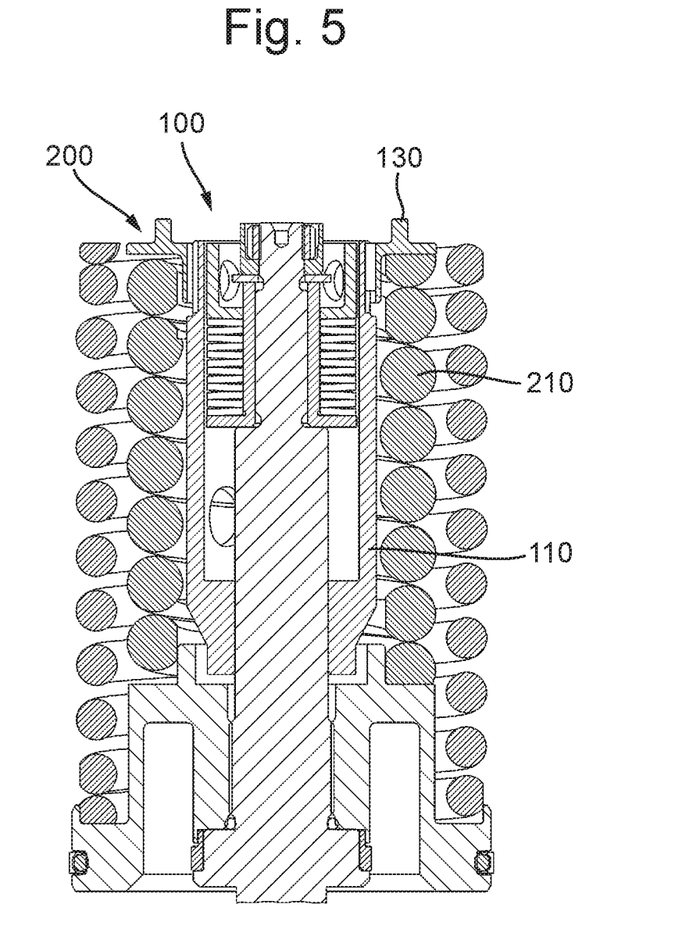
FIG. 5 shows a schematic of a cross-section of an exemplary spring compression assembly for use in a deployment actuator for a ram air turbine.

Referring additionally to FIG. 5, a spring compression assembly 200 comprises a spring compression device 100 and a spring 210. The spring 210 may be mounted on the spring sleeve 110, such that it abuts the spring adjustment member 130. The spring compression device 100 may be operated to adjust the operating length L, and thereby compress/decompress the adjoining spring 210. In this way, the spring preload or compression level may be adjusted. It is anticipated that the desired preload may be set during assembly, and later adjusted during maintenance. An auxiliary spring is also shown inside spring sleeve 110.

Figure 6:
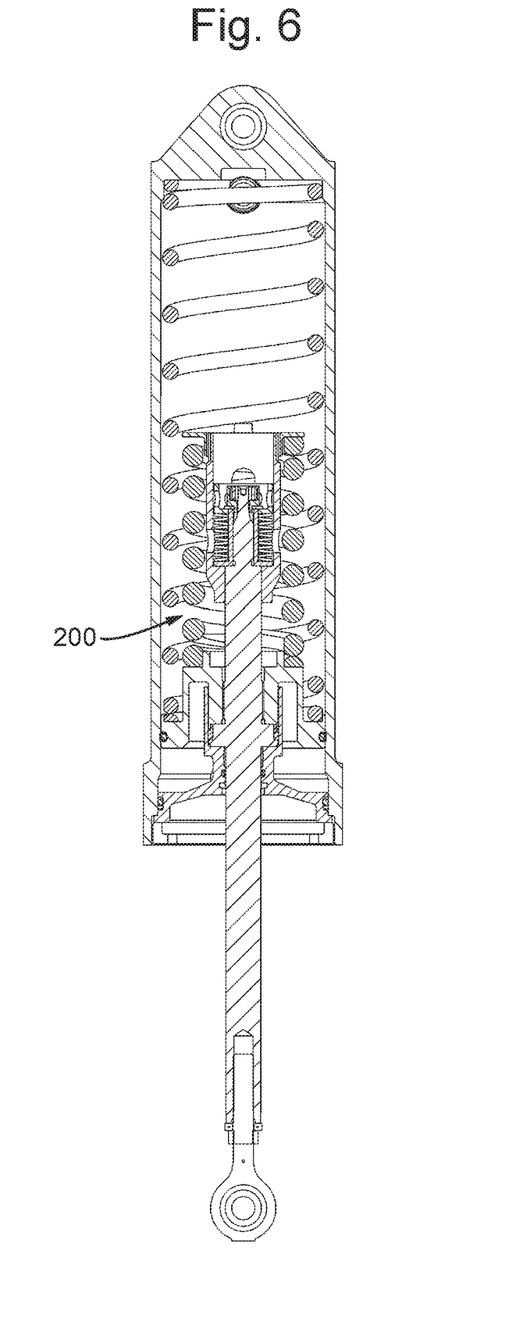
FIG. 6 shows a schematic of a cross-section of an exemplary deployment actuator for a ram air turbine.

As shown in FIG. 6, a deployment actuator for an RAT may comprise the spring compression device 100 or spring compression assembly 200 as set out in any of the embodiments above. An advantage of being able to adjust the spring preload is that "off the shelf" springs may be used as part of the RAT actuator, since their compression level can be adjusted to suit the need; this removes the need to manufacture high precision springs.

The following embodiments set out features of the present disclosure:

Embodiment 1

A deployment actuator for a ram air turbine includes a spring; and an adjustable preload mechanism.

Embodiment 2

A deployment actuator according to any prior embodiment wherein the adjustable preload mechanism comprises a spring compression device that includes: a spring sleeve configured to receive a spring; a spring adjustment member provided on and engaged with the spring sleeve and configured to abut a spring mounted on the spring sleeve. In this embodiment, the spring sleeve and spring adjustment member define an operating length of the spring compression device, and the spring adjustment member is configured to be moved relative to the spring sleeve to adjust the operating length of the spring compression device. Mechanism in this embodiment further includes at least one blocking component for blocking movement between the spring sleeve and the spring adjustment member.

Embodiment 3

A deployment actuator according to any prior embodiment, wherein the spring sleeve and spring adjustment member are engaged with a threaded connection.

Embodiment 4

A deployment actuator according to any prior embodiment, wherein an exterior surface of the spring sleeve and an interior surface of the spring adjustment member each have at least one recess which align to form a hole for receiving the blocking component.

Embodiment 5

A deployment actuator according to any prior embodiment wherein the hole extends in a direction parallel to a longitudinal axis of the spring sleeve.

Embodiment 6

A deployment actuator according to any prior embodiment wherein the blocking component is press-fitted into the hole.

Embodiment 7

A deployment actuator according to any prior embodiment, wherein the blocking component comprises a pin.

Embodiment 8

A deployment actuator according to any prior embodiment, wherein the spring adjustment member further comprises a grip feature configured to engage with a tool for adjusting the position of the spring adjustment member along a longitudinal axis of the spring sleeve.

Embodiment 9

A deployment actuator according to any prior embodiment, wherein the spring adjustment member has a radially extending flange to provide a stop for a spring mounted on the spring sleeve.

Embodiment 10

A deployment actuator according to any prior embodiment, further comprising a first spring mounted on the spring sleeve and abutting the spring adjustment member.

Embodiment 11

A deployment actuator according to any prior embodiment, further comprising a second spring housed inside the spring sleeve.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A deployment actuator for a ram air turbine comprising:
an adjustable preload mechanism comprising:
a spring sleeve configured to receive a spring;
a spring adjustment member provided on and engaged with the spring sleeve and configured to abut a spring mounted on the spring sleeve, wherein: the spring sleeve and spring adjustment member define an operating length (L) of the adjustable preload mechanism, and the spring adjustment member is configured to be moved relative to the spring sleeve to adjust the operating length of the adjustable preload mechanism; and at least one blocking component for blocking movement between the spring sleeve and the spring adjustment member;

wherein an exterior surface of the spring sleeve and an interior surface of the spring adjustment member each have at least one recess which align to form a hole for receiving the blocking component and wherein the hole extends in a direction parallel to a longitudinal axis (R) of the spring sleeve; and a first spring mounted on the spring sleeve and abutting the spring adjustment member.

2. The deployment actuator according to claim 1, further comprising a second spring housed inside the spring sleeve.

3. The deployment actuator according to claim 1, in combination with a ram air turbine.

4. The deployment actuator of claim 1, wherein the spring sleeve and spring adjustment member are engaged with a threaded connection.

5. The deployment actuator of claim 1, wherein the blocking component is press-fitted into the hole.

6. The deployment actuator of claim 1, wherein the blocking component comprises a pin.

7. The deployment actuator of claim 1, wherein the spring adjustment member further comprises a grip feature configured to engage with a tool for adjusting the position of the spring adjustment member along a longitudinal axis (R) of the spring sleeve.

8. The deployment actuator of claim 1, wherein the spring adjustment member has a radially extending flange to provide a stop for a spring mounted on the spring sleeve.

9. The deployment actuator of claim 1, in combination with a ram air turbine.

10. A method for adjusting the preload of the deployment actuator, comprising:

providing a deployment actuator as recited in claim 1;

adjusting the operating length (L) of the adjustable preload mechanism with the spring adjustment member by moving the spring adjustment member with respect to the spring sleeve; and blocking movement between the spring sleeve and the spring adjustment member with the blocking component;

wherein the step of blocking movement between the spring sleeve and the spring adjustment member with the blocking component comprises disposing the blocking component into the hole in a direction parallel to the longitudinal axis (R) of the spring sleeve.

11. The method according to claim 10, wherein the spring sleeve and spring adjustment member are engaged with a threaded connection, and the step of adjusting the operating length (L) of the adjustable preload mechanism with the spring adjustment member comprises screwing the spring adjustment member along the spring sleeve.

12. The method according to claim 10, wherein the spring adjustment member further comprises a grip feature (configured to engage with a tool, and the step of adjusting the operating length (L) of the adjustable preload mechanism with the spring adjustment member comprises engaging the grip feature with a tool to adjust the position of the spring adjustment member along a longitudinal axis (R) of the spring sleeve.

* * * * *